UNITED STATES PATENT OFFICE.

ALBERT DECATUR BARR, OF McHUE, ARKANSAS.

FERMENTS AND PROCESS OF MAKING THE SAME.

1,253,334.  Specification of Letters Patent.  Patented Jan. 15, 1918.

No Drawing.  Application filed June 3, 1916. Serial No. 101,443.

*To all whom it may concern:*

Be it known that I, ALBERT DECATUR BARR, a citizen of the United States, residing at McHue, county of Independence, State of Arkansas, have invented new and useful Ferments and Processes of Making the Same, of which the following is a specification.

This invention relates to new ferments, consisting of enzym-containing bodies having the power of splitting carbohydrates and of exerting such action in acid, alkaline or neutral media, and having also the properties and powers of a proteolytic enzym; and to the process for making these ferments.

While many bacteria have the power of converting carbohydrates into acid bodies, generally lactic acid, this power is not possessed by the unorganized ferments or enzyms. It may be said in general that the production of lactic acid from carbohydrates, as heretofore accomplished, is accompanied by life action in some way. I have discovered, however, that the unorganized natural ferments, or enzyms, and in particular, the proteolytic enzyms, such as pepsin, pancreatin, papain, etc., can be endowed with the power of hydrolysis, or splitting up of carbohydrates with the production of acid, by treatment with an amino (or amido) acid. But small quantities of the amino acid are necessary for this purpose, a proportion of about five per cent. of the enzym treated being generally sufficient.

Any of the proteolytic enzyms may be used in making my new ferments. Somewhat better results can be obtained by the use of a mixture of two or more of these enzyms. If, however, only one enzym is used, I have found it desirable to mix with it an amount of proteid matter equal to $\frac{1}{100}$ of the amount of the enzym present.

Any of the amino acids may be used in making my new ferments, and I have found that the sodium or potassium salts of these acids act as well as the acids themselves. I prefer, however, to use leucin or glycocoll (amino-acetic acid).

My new ferments break up all forms of the carbohydrates into lactic acid, carbon-dioxid and water, exercising this action in acid, alkaline or neutral media. They are most active between 95° F. and 103° F., and most of them are killed or lose their activity at 110° F., to 130° F. The described new power is an added power, the original fermentative power of the material being retained. For instance, pepsin treated in the present manner will break up all the carbohydrates with the production of lactic acid, doing this in acid, alkaline or neutral media, but it still retains its proteolytic power, this latter power being exercised only, as usual, in acid media. On the other hand, pancreatin treated in the present manner will acquire a power to break up carbohydrates in various media as just described and retains its proteolytic power, but only in alkaline media. In other words, the new power is superimposed upon or added to the normal activity of the enzym.

One specific example of my new ferments is made as follows: I mix one troy ounce of U. S. P. pepsin with one troy ounce of U. S. P. pancreatin and triturate the mixture, in order to insure intimate admixture of the two components. To this mixture I add forty-eight grains of leucin, and once more triturate the mixture. If either of the enzyms is omitted, I may substitute an amount of other proteid matter amounting to not more than one per cent. of the enzym present.

The physical appearance of my new ferments is that of a mixture of commercial pancreatin and commercial pepsin and conforms to the usual and pharmacopœial tests for these bodies. It also responds to tests for the amino (or amido) acids employed. Like the original enzyms used, it will break up albuminoids into albumoses, peptones, etc., and it will also break up a solution of cane sugar, with production of lactic acid and carbon-dioxid.

What I claim is:—

1. A ferment having the power of splitting carbohydrates with the production of acid bodies and of exercising this action in acid, alkaline or neutral media, and having also proteolytic powers, and having the physical appearance of, and responding to the usual tests for, a proteolytic enzym, and responding also to the tests for amino acids.

2. A ferment comprising a mixture of an enzym with a compound containing an amino acid radical.

3. A ferment comprising a mixture of an enzym with a relatively small amount of a compound containing an amino acid radical.

4. A ferment comprising a mixture of an enzym with a relatively small amount of an amino acid.

5. A ferment comprising a mixture of an enzym with a relatively small amount of leucin.

6. A ferment comprising a mixture of a proteolytic enzym and a compound containing an amino acid radical.

7. A ferment comprising a mixture of a proteolytic enzym with a relatively small amount of animo acid.

8. A ferment comprising a mixture of a proteolytic enzym, proteid matter, and a compound containing an amino acid radical.

9. A ferment comprising a mixture of a proteolytic enzym and proteid matter in about the proportion of 100 to 1 and a relatively small amount of an amino acid.

10. A ferment comprising a mixture of a proteolytic enzym, another proteolytic enzym, and a compound containing the amino acid radical.

11. A ferment comprising a mixture of a proteolytic enzym and another proteolytic enzym in about equal portions, and a relatively small amount of an amino acid.

12. A ferment comprising a mixture of a plurality of proteolytic enzyms with a relatively small amount of a compound containing the amino acid radical.

13. A ferment comprising a mixture of a plurality of proteolytic enzyms and a relatively small amount of an amino acid.

14. A ferment comprising a mixture of pancreatin and pepsin in about equal portions, with a relatively small amount of amino acid.

15. A ferment comprising a mixture of pepsin and pancreatin in about equal portions, and an amount of leucin equal to about 5% of the total amount of the enzyms.

16. The process of making a ferment having the power of splitting carbohydrates, which process consists in mixing an enzym with a relatively small amount of a compound containing an amino acid radical and triturating this mixture.

17. The process of making a ferment having the power of splitting carbohydrates, which consists in mixing a plurality of proteolytic enzyms, triturating this mixture, adding a relatively small proportion of a compound containing the amino acid radical, and again triturating the mixture.

ALBERT DECATUR BARR.